US008659398B2

(12) United States Patent
Bell

(10) Patent No.: US 8,659,398 B2
(45) Date of Patent: Feb. 25, 2014

(54) SYSTEM AND METHOD FOR BUFFERED WIRELESS DEVICE ENROLLMENT IN A SECURITY SYSTEM

(75) Inventor: Dwayne A. Bell, Zephyr (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 576 days.

(21) Appl. No.: 12/403,453

(22) Filed: Mar. 13, 2009

(65) Prior Publication Data

US 2010/0231361 A1 Sep. 16, 2010

(51) Int. Cl.
*H04Q 5/22* (2006.01)
*G08B 29/00* (2006.01)

(52) U.S. Cl.
USPC ........................................ 340/10.42; 340/506

(58) Field of Classification Search
USPC ........................................ 340/10.42
See application file for complete search history.

(56) References Cited

U.S. PATENT DOCUMENTS 6,624,750 B1 * 9/2003 Marman et al. ............... 340/506
7,079,020 B2 7/2006 Stilp
7,363,488 B2 4/2008 Hinkson
2004/0212500 A1 * 10/2004 Stilp ............................ 340/541
2005/0052276 A1 * 3/2005 Kumazaki et al. ........... 340/5.61
2007/0063836 A1 3/2007 Hayden et al.
2008/0162673 A1 * 7/2008 Basheer Ahamed et al. . 709/220
2009/0174550 A1 * 7/2009 Aninye et al. ............ 340/539.13
2010/0017595 A1 * 1/2010 King et al. .................... 713/151

FOREIGN PATENT DOCUMENTS

EP 1916640 4/2008

OTHER PUBLICATIONS

Patent Cooperation Treaty, International Search Report, mailed Jul. 8, 2010, for International Application No. PCT/CA2010/000371.
Search Report received for European Patent Application No. 10750300.5, mailed Jul. 26, 2012, 6 pgs.

* cited by examiner

*Primary Examiner* — Brian Zimmerman
*Assistant Examiner* — Cal Eustaquio
(74) *Attorney, Agent, or Firm* — Kacvinsky Daisak pllc

(57) ABSTRACT

A system and method are disclosed for enrolling wireless security system devices (alarms, detectors, lights) in a security system. A controller is provided and is capable of exchanging wireless signals with the devices. The system has an enroll mode where the wireless devices transmit enroll signals to the controller. The enroll signals contain an identifier associated with each device. An installer uses a keypad or other interface device to review each of the devices that have sent a signal, and to accept them for enrollment or ignore them. After review, the controller sends a signal to the devices instructing them to cease transmitting enroll signals to the controller. If the power of an enrolled device is cycled (battery replacement), another enroll command is sent to the controller. The controller determines whether the device was already enrolled, and if it has the controller sends a signal to the device to stop sending the enroll command.

18 Claims, 3 Drawing Sheets

SYSTEM AND METHOD FOR BUFFERED WIRELESS DEVICE ENROLLMENT IN A SECURITY SYSTEM

FIELD OF THE INVENTION

Embodiments of the invention relate to the field of wireless security systems. More particularly, embodiments of the invention relate to a system and method for automatic enrollment of wireless security system devices.

DISCUSSION OF RELATED ART

Typical building alarm systems often include a number of sensors positioned throughout a building to alert occupants of fire and non-fire emergencies. These sensors may include smoke detectors, fire alarms, security alarms, emergency lighting, strobe lighting, door contacts, motion detectors, and the like. The sensors are usually connected to a system controller that contains specific information regarding each sensor, so that when a signal is received from a sensor, the controller immediately knows what area of the building is affected and what type of condition is occurring (e.g., open window, smoke, fire). In addition, for systems employing wireless sensors in a zoned configuration, the controller must know which sensors are part of that controller's zone so that only the sensors in that zone will be acted upon.

To provide the controller with the necessary sensor information, during system installation it is necessary to "enroll" the sensors with the controller. Enrolling the sensors can require extensive manual input of at least the serial number for each sensor in the system. This technique, aside from being arduous, is subject to errors since the installer often must read the serial number from a plate on the sensor and then must correctly type that serial number into a keypad associated with the controller.

Automated systems for enrolling wireless sensors may be similarly cumbersome in that they often require the individual sensors to be operated in a unique manner (e.g., reducing sensor power to a predetermined level), or they require the sensors to be passed very close to the controller in order for the controller to read the serial number, or they require the sensors to be enrolled in a specific predetermined sequence.

There is a need for an improved system for efficiently enrolling wireless sensors in security systems. The system should minimize the total amount of manual action required, should eliminate errors associated with current manual input techniques, and should provide a simplified automated enrollment process for systems employing a plurality of wireless sensors.

SUMMARY OF THE INVENTION

The disclosed system and method increase the efficiency of enrolling wireless security system devices by reducing the amount of manual intervention required with prior systems. Specifically, the disclosed system and method use an enroll command to buffer the serial numbers and/or other information relating to un-enrolled wireless (RF) devices.

A method for enrolling wireless devices in a security system is disclosed. The method may comprise receiving, at a controller, a wireless signal from each of a plurality of wireless devices, the wireless signal from each wireless device containing an enroll command and a unique identifier associated with that wireless device; storing the unique identifiers in memory associated with the controller; manually confirming enrollment of at least one of the plurality of wireless devices; and sending an enroll confirmation command from the controller to each manually confirmed wireless device to instruct each said device to stop sending enroll commands.

A system is disclosed for enrolling wireless devices in a security system. The system may comprise a controller having a processor and a memory, a plurality of wireless devices, and a machine-readable storage medium encoded with a computer program code such that, when the computer program code is executed by a processor, the processor performs a method comprising: receiving a wireless signal from each of the plurality of wireless devices by the controller, the wireless signal from each wireless device containing an enroll command and a unique identifier associated with that wireless device; storing the unique identifiers in the memory; requesting manual confirmation of enrollment of at least one of the plurality of wireless devices; and sending an enroll confirmation command from the controller to each manually confirmed wireless device to instruct each said device to stop sending enroll commands.

BRIEF DESCRIPTION OF THE DRAWINGS

The details of the invention, both as to its structure and operation, may be obtained by a review of the accompanying drawings, in which like reference numerals refer to like parts, and in which.

DESCRIPTION OF EMBODIMENTS

Figure 1:
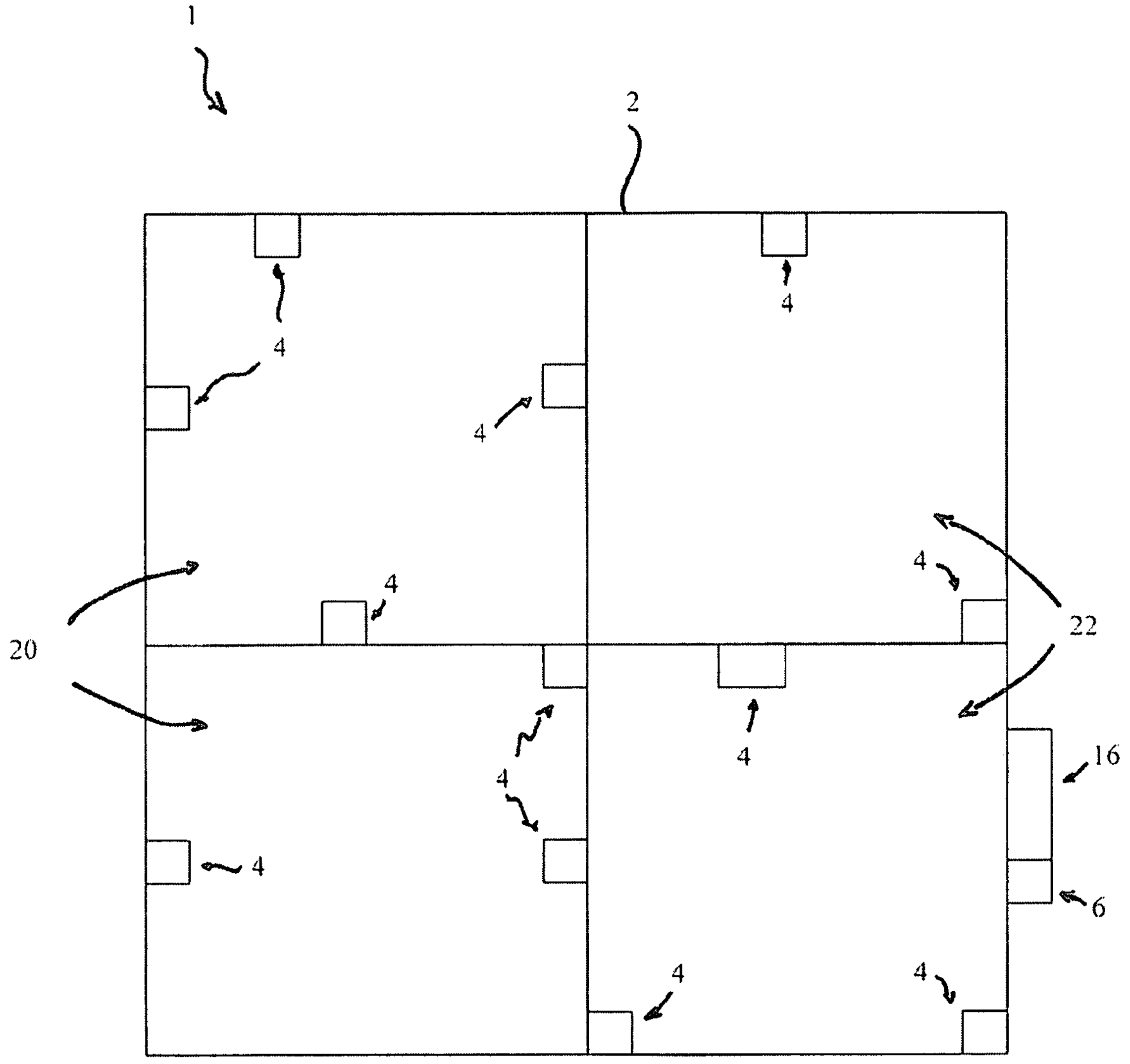
FIG. 1 is a schematic diagram of the disclosed system.

The present invention will now be described more fully hereinafter with reference to the accompanying drawings, in which preferred embodiments of the invention are shown. It will be appreciated, however, that the invention may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Referring to FIG. 1, a security system 1 for a commercial or residential building 2 may include a plurality of wireless devices 4 positioned throughout the building or a portion of the building, and a system controller 6 configured to receive signals from the devices 4. A non-limiting exemplary list of such wireless devices 4 includes, heat, smoke, fire and toxic gas detectors, fire alarms, security alarms, emergency lighting, strobe lighting, door contact detectors, motion detectors, and the like. The wireless devices 4 may be capable of sending wireless signals to the controller 6 indicative of one or more alarm or status conditions. Communications between the devices 4 and the controller 6 may be via one or more wireless (e.g., RF, infrared, laser) communications links.

The wireless devices 4 may be battery powered, and may be configured to transmit a signal representative of the status of the devices (e.g., alarm condition or other status). The devices 4 may also be configured to transmit an identification signal that enables the system controller 6 to recognize the particular device, or the type of device (e.g., door contact, motion detector) being enrolled. In one embodiment, the identification signal represents a unique serial number or other unique identifier associated with the device 4. In another embodiment, the identification signal include information regarding wireless signal strength of the device, and/or the type of device being enrolled.

Figure 2:
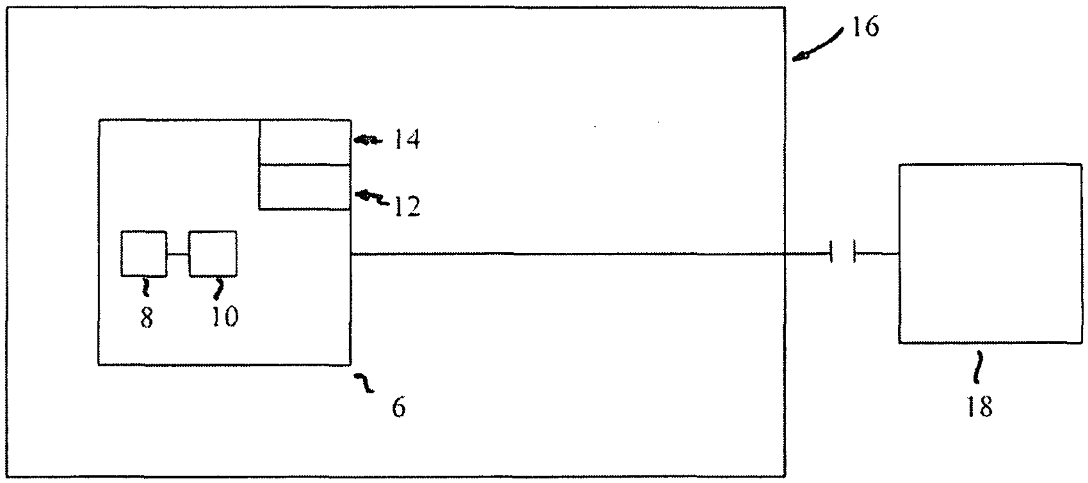
FIG. 2 is a schematic diagram of an exemplary controller of the system of FIG. 1.

Referring to FIG. 2, the controller 6 may have a processor 8 and local memory 10 (e.g., a buffer) for storing a variety of information relating to the system 1 and the devices 4. The controller 6 may have separate zones for different devices 4 being monitored. In one exemplary embodiment, the controller may have a first zone that includes a burglar alarm sensor, and a second zone that includes a fire sensor. Often a single wireless zone has a single detection device, such that that zone has a specific functionality (e.g., entry/exit door, smoke detector). It will be appreciated, however, that a single wireless zone may also be configured to support multiple device types.

The processor may further have a keypad 12 or other user interface device associated therewith to enable a user to manipulate the controller 6. The keypad 12 and/or controller 6 may have a display 14 for communicating system status or other information regarding the controller 6 or one or more of the devices 4 to the user.

The security system 1 may have local and/or remote alarm outputs. Local alarms may include indoor and/or outdoor bells or sirens and/or lights/strobes, which may be used to signal an evacuation notice or to scare off an intruder. Where a remote alarm feature is provided, the controller 6 may be housed in a security system panel 16 associated with the monitored building 2, and the panel 16 may be in communication with a central monitoring facility 18 that monitors the status of the security system 1 and initiates appropriate action (e.g., alert building personnel, alert appropriate local authorities) when an alarm condition exists, as indicated by one or more of the devices 4. Often, the central monitoring system 18 is geographically remote from the building 2 being monitored, and in practical application the central monitoring facility 18 will often simultaneously monitor a plurality of different buildings.

During installation, a technician may mount the system panel 16, controller 6, and wireless devices 4 at desired locations throughout the monitored building 2. In one embodiment, the security system 1 is split into at least first and second zones 20, 22, with a first plurality of devices 4 associated with the first zone 20, and a second plurality of devices 4 associated with the second zone 22. In the illustrated embodiment (FIG. 1), first and second zones 20, 22 are identified with different sets of rooms in the building 2. It will be appreciated, however, that the system 1 may have any of a variety (i.e., number, arrangement) of zones as desired for the particular application.

The controller 6 may have a variety of operating modes, including an enroll mode which is used to enroll the devices 4, by zone, in the security system 1. The controller 6 may also have a monitoring or operating mode for receiving a plurality of signals from the enrolled devices 4 indicative of their status. The signals transmitted from the devices 4 to the controller 6 may inform the controller 6 of the status of the particular device 4, including alarm conditions, low power conditions, power cycling conditions, enrollment requests, and the like.

Figure 3:
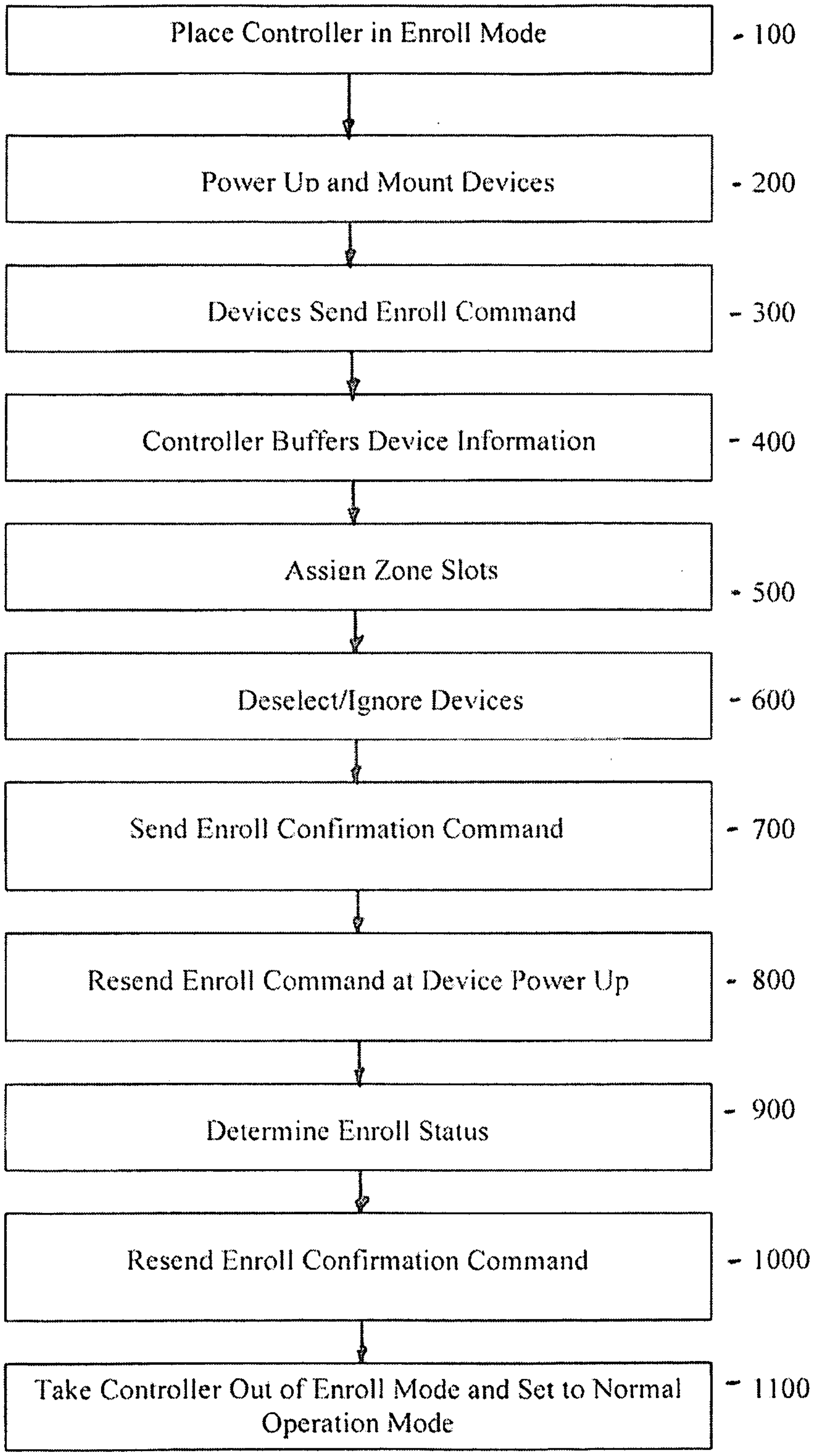
FIG. 3 is a flowchart describing an exemplary method of operating the system of FIG. 1.

Referring now to FIG. 3, in one exemplary embodiment of the disclosed method, an installer (i.e., technician or other user) may place the controller 6 into an enroll mode at step 100. At step 200, the installer may power up and mount a plurality of wireless devices 4 to be enrolled. At step 300, each device 4 may send a wireless signal containing an enroll command to the controller 6.

It will be appreciated that when using multiple RF devices there is a risk of signal interference between devices. To minimize interference the devices 4 may be configured so that they do not all transmit their enroll commands simultaneously, and instead the devices 4 may employ a staggered timing pattern between RF "rounds." Thus, in one embodiment, each RF device may send a set of enroll commands every "x" seconds (e.g., 30 seconds. 40 seconds, 60 seconds), such that every "x" seconds the device 4 may send the enroll command "y" times (e.g., 5 times, 10 times, 15 times). The number "y" and time delay "x" between the individual rounds of RF data (i.e., the enroll command) may be staggered as desired to achieve the objective of minimizing interference.

In one embodiment, each device 4 is configured to automatically send the enroll command upon power-up (e.g., battery replacement). It will be appreciated that other techniques can be used to initiate sending of the enroll command, such as pressing the tamper switch, etc., but that power cycling is contemplated as the most controlled and practical way of enrolling a device 4. The enroll command may be sent intermittently and/or continuously until the device 4 is instructed by the controller 6 to cease transmission.

In an alternative embodiment, a timeout feature may be provided so that if the device 4 does not receive an enroll confirmation command from the controller 6 (described below), it will not continue to transmit the enroll command indefinitely. A timeout feature may used in applications where the installer mounts all of the devices 4 on one day, then enrolls them in the system on the second day. The timeout feature would reduce the drain on the device battery that would result from sending the enroll command all night long.

Alternatively, in lieu of (or in addition to) a timeout feature, one or more of the devices 4 may comprise a local error/timeout display to alert a user that the device 4 has not received an enroll confirmation command from the controller 6 within a predetermined time period. Where the device 4 has an LED and/or LCD display, an error message or flash pattern could be provided to indicate an error condition such as a timeout.

The enroll command may contain the serial number or other unique identifier for the device 4 or the type of device being enrolled. The controller 6 may buffer device information for each enroll command detected in local memory at step 400. The installer may return to the keypad 12 (or other user input device) at step 500 and manually assign zone slots and/or device definitions, etc., for each device 4 being enrolled. At step 600, the installer may ignore or deselect any devices 4 that are not part of the zone being enrolled. This can occur where multiple wireless security systems or zones are being installed at the same time in close proximity to each other such that some errant signals are received from wireless devices that are not intended to be part of the system being installed.

Once zone number(s)/slot assignment(s) have been made for the devices 4, at step 700 the controller 6 may send a wireless signal containing an enroll confirmation command back to the devices 4 to stop the devices 4 from sending further enroll commands. In the absence of this enroll confirmation command, the devices 4 would continue to send their individual enroll commands to the controller 6 (unless a timeout feature is used, as previously described). Thus, prompt transmission of the enroll confirmation command will conserve power in the individual devices 4. The enroll confirmation command may also instruct the devices to begin and/or resume normal operations (e.g., motion detectors look for motion, smoke detectors start to monitor for smoke).

Subsequent to enrollment, if the power of an enrolled device 4 is cycled (e.g., due to a battery change), then at step 800 the device 4 may again send a wireless signal containing an enroll command to the controller 6. At step 900, the controller 6 will determine whether the device is already enrolled. If the device has been previously enrolled, the controller will send a wireless signal containing an enroll confirmation command back to the device 4 at step 1000 to stop the enrollment process. This confirmation command may also instruct the device to resume normal operations At step 1100, the controller 6 is taken out of enrollment mode, and placed into operating mode in which it is configured to receive operational (e.g., alarm) signals from the devices 4.

If the controller 6 is not in the device enrollment mode, it may still receive and reply to enroll commands sent from devices 4 that were previously enrolled. In this way the user can change a battery in an enrolled device 4 without having to reconfigure the controller into enrollment mode. Any "new" devices (i.e., devices not previously enrolled in the system) that send an enrollment command, however, will be ignored by the controller 6 when the controller 6 is in operating mode. Thus, if a completely new device 4 is added to the system the user needs to place the controller 6 in the device enrollment mode to enable the new device 4 to be enrolled.

The device enrollment process can be performed for a plurality of different zones and systems using the aforementioned method.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method for enrolling wireless devices in a security system, comprising:

receiving, at a controller, a wireless signal from each of a plurality of wireless devices, the wireless signal from each wireless device containing an enroll command and a unique identifier associated with that wireless device;

storing the unique identifiers in memory associated with the controller; manually confirming enrollment of at least one of the plurality of wireless devices; and deselecting at least one of the plurality of wireless devices such that the at least one deselected wireless device does not become enrolled in the system;

wherein the at least one of the deselected wireless device of the plurality of wireless devices is part of a secondary wireless security system or is in the process of being enrolled in the second wireless security system;

wherein each of the plurality of wireless devices transmit the enroll command and the unique identifier based on a staggered timing pattern.

2. The method of claim 1, wherein the unique identifier comprises at least one of a device serial number, a device type and wireless signal strength.

3. The method of claim 1, wherein the step of manually confirming enrollment further comprises entering a device definition for the at least one of the plurality of wireless devices.

4. The method of claim 1, wherein the step of manually confirming enrollment further comprises entering zone or device definition information into a keypad associated with the controller.

5. The method of claim 1, further comprising resending an enroll command from at least one of the plurality of wireless devices to the controller after the power of the at least one wireless device has been cycled.

6. The method of claim 5, wherein in response to the resent enroll command, the controller determines whether the at least one wireless device is already enrolled and sends an enroll confirmation command to the at least one wireless device to stop resending the enroll command.

7. The method of claim 1, wherein at least one of the plurality of wireless devices is selected from the list consisting of a fire alarm, a smoke alarm, a security alarm, an emergency light, a strobe light, and a window break detector.

8. The method of claim 1, wherein the step of manually confirming enrollment comprises reviewing the unique identifier for each of the plurality of wireless devices, selecting a first one of the plurality of devices for enrollment in a zone of a building being monitored by the system.

9. The method of claim 8, wherein the step of manually confirming enrollment further comprises selecting a second one of the plurality of devices for enrollment in the zone of the building being monitored by the system.

10. A system for enrolling wireless devices in a security system, comprising a controller having a processor and a memory, a plurality of wireless devices, and a machine-readable storage medium encoded with a computer program code such that, when the computer program code is executed by a processor, the processor performs a method comprising:

receiving a wireless signal from each of the plurality of wireless devices by the controller, the wireless signal from each wireless device containing an enroll command and a unique identifier associated with that wireless device;

storing the unique identifiers in the memory;

requesting manual confirmation of enrollment of at least one of the plurality of wireless devices; and ignoring at least one of the plurality of wireless devices such that the at least one ignored wireless device does not become enrolled in the system;

wherein the at least one of the ignored wireless devices of the plurality of wireless devices is part of a secondary wireless security system or is in the process of being enrolled in the second wireless security system;

wherein each of the plurality of wireless devices transmit the enroll command and the unique identifier based on a staggered timing pattern.

11. The system of claim 10, wherein the unique identifier comprises at least one of a device serial number, a device type and wireless signal strength.

12. The system of claim 10, wherein the step of requesting manual confirmation of enrollment further comprises receiving a device definition for the at least one of the plurality of wireless devices.

13. The system of claim 10, wherein the step of requesting manual confirmation of enrollment further comprises receiving zone or device definition information from a keypad associated with the controller.

14. The system of claim 10, further comprising resending an enroll command from at least one of the plurality of wireless devices to the controller after the power of the wireless device has been cycled.

15. The system of claim 14, wherein in response to the resent enroll command, the processor further performs the steps comprising determining whether the at least one wireless device is already enrolled and sending an enroll confirmation command to the at least one wireless device to stop resending the enroll command.

16. The system of claim 10, at least one of the plurality of wireless devices is selected from the list consisting of a fire alarm, a smoke alarm, a security alarm, an emergency light, a strobe light, and a window break detector.

17. The system of claim 10, wherein the step of manually confirming enrollment comprises reviewing the unique identifier for each of the plurality of wireless devices, and selecting a first portion of the plurality of devices for enrollment in a zone of a building being monitored by the system.

18. The system of claim 17, wherein the step of manually confirming enrollment further comprises selecting a second portion of the plurality of devices for enrollment in the zone of the building being monitored by the system.

* * * * *